(12) United States Patent
Rosenboom

(10) Patent No.: US 10,426,076 B1
(45) Date of Patent: Oct. 1, 2019

(54) DEPTH WHEELS

(71) Applicant: Lyn A. Rosenboom, Clifton, IL (US)

(72) Inventor: Lyn A. Rosenboom, Clifton, IL (US)

(*) Notice: Subject to any disclaimer, the term of this patent is extended or adjusted under 35 U.S.C. 154(b) by 47 days.

(21) Appl. No.: 15/894,994

(22) Filed: Feb. 13, 2018

Related U.S. Application Data

(60) Provisional application No. 62/459,643, filed on Feb. 16, 2017.

(51) Int. Cl.
*A01B 76/00* (2006.01)
*A01B 5/04* (2006.01)
*A01B 15/14* (2006.01)
*A01B 15/16* (2006.01)
*A01B 49/02* (2006.01)
*B60C 7/06* (2006.01)

(52) U.S. Cl.
CPC .............. *A01B 76/00* (2013.01); *A01B 5/04* (2013.01); *A01B 15/14* (2013.01); *A01B 15/16* (2013.01); *A01B 49/027* (2013.01); *B60C 7/06* (2013.01); *B60C 2200/08* (2013.01)

(58) Field of Classification Search
CPC .......... A01B 76/00; A01B 5/04; A01B 15/14; A01B 15/16; A01B 49/027
See application file for complete search history.

(56) References Cited

U.S. PATENT DOCUMENTS

| | | | |
|---|---|---|---|
| 5,333,694 A | 8/1994 | Roggenbuck et al. | |
| 5,520,125 A | 5/1996 | Thompson et al. | |
| 6,761,120 B2 | 7/2004 | Kovach et al. | |
| 7,213,523 B2 | 5/2007 | Neudorf et al. | |
| 7,481,278 B1 * | 1/2009 | Pomedli | A01O 5/064 |
| | | | 111/167 |
| 7,857,072 B2 * | 12/2010 | Kovach | A01O 7/203 |
| | | | 172/140 |
| 7,866,270 B2 | 1/2011 | Ankenman | |
| 9,516,803 B1 | 12/2016 | Rosenboom | |

* cited by examiner

*Primary Examiner* — Tara Mayo-Pinnock
(74) *Attorney, Agent, or Firm* — Philip L. Bateman

(57) ABSTRACT

A row implement has a disk and depth wheel assembly attached to the frame. The assembly includes: (i) a bracket; (ii) a horizontal freely rotating shaft; (iii) a disk attached to the shaft; and (iv) a depth wheel attached to the shaft on either side of the disk, so the shaft, disk, and the depth wheel rotate together.

9 Claims, 3 Drawing Sheets

DEPTH WHEELS

CROSS-REFERENCE TO RELATED APPLICATION

This application claims the benefit of U.S. Provisional Application Ser. No. 62/459,643, Feb. 16, 2017.

FIELD OF THE INVENTION

This invention relates to farming. More particularly, this invention relates to row implements for the tillage, planting, and fertilization of farmland.

BACKGROUND OF THE INVENTION

It is well known that crops such as corn and soybeans grow best in soil that is loose, rich in nutrients, and free of debris. After a crop is harvested, the soil is often compacted, depleted of nutrients, and full of crop residue and other debris. To restore the soil to optimal conditions, the soil is often tilled immediately before planting. Tilling is also known as cultivating or plowing (also spelled "ploughing"). The soil may also be tilled immediately after harvest. The conventional method of tillage is to treat the entire field. More recently, it has become popular to treat only the narrow strips of soil that will contain the seed rows. This method of tillage is commonly known as strip tillage or zone tillage. Strip tillage saves time and energy and reduces erosion.

Strip tillage is performed by driving a tractor through the field pulling a wheeled toolbar to which multiple row implements are attached. The row implements are spaced apart to correspond to the seed rows that will be planted. A conventional row implement is shown in FIGS. 1 and 2. The direction of movement of the row unit is from left to right as indicated by the large straight arrow. The row implement 10 contains a frame 20 with a bracket 21 or other suitable means for attachment to a toolbar. Attached to the frame are two cleaning disks 30 to clear crop residue and other debris, two or three scoring disks 40 (also spelled "discs" and also known as colters or coulters) to break the surface of the ground, and two depth wheels 50 attached to the outer scoring disks to control the vertical position of the row implement relative to the ground. Each scoring disk, with or without an attached depth wheel, rotates independently. Scoring disks are substantially flat or contain waves, ripples, or other protrusions and indentations.

The conventional row unit shown in FIGS. 1 and 2 also contains a knife 60 attached to a shank to create a trench (also known as a furrow) in the soil into which the fertilizer is applied and/or into which the seeds are deposited if planting is being conducted, a tube 70 to apply fertilizer and/or seeds into the trench, and two closing disks 80 to fill in the trench to create a raised berm where the trench had been formed. Many implements also contain one or more tamping wheels 90 at the rear that tamp the berm to the desired density and cross section. The tamping wheel shown is disclosed in Rosenboom, U.S. Pat. No. 9,516,803, Dec. 13, 2016.

A variety of row implements have been disclosed, including Roggenbuck et al., U.S. Pat. No. 5,333,694, Aug. 2, 1994; Thompson et al., U.S. Pat. No. 5,520,125, May 28, 1996; Kovach et al., U.S. Pat. No. 6,761,120, Jul. 13, 2004; Neudorf et al., U.S. Pat. No. 7,213,523, May 8, 2007; and Ankenman, U.S. Pat. No. 7,866,270, Jan. 11, 2011.

As previously mentioned, row implements contain a means for controlling the position of the row implement relative to the ground, i.e., for controlling the depth the scoring disks and knife penetrate into the ground. The means for controlling the position is generally a pair of depth wheels. The depth wheels are generally steel concentric rings that are bolted or otherwise attached to the sides of the scoring disks. Depth wheels attached to independently rotating scoring disks suffer from two problems. First, trash tends to build up along the right angle corner where the depth wheel meets the scoring disk. Second, the independently rotating scoring disks with attached depth wheels tend to skid rather than rotate, especially in wet fields or fields having a large amount of trash. As they skid, trash builds up and causes plugging in and between the row implements.

Some row implements contain freely rotating, pneumatic (air filled) rubber depth wheels. The disadvantage of pneumatic rubber depth wheels is that they wear out and must be replaced periodically. Other row implements contain freely rotating steel depth wheels that are not attached to the scoring disks. The disadvantage of these independently rotating steel depth wheels is that they tend to skid rather than rotate. As they skid, trash builds up and causes plugging in and between the row implements.

Accordingly, there is a demand for a row implement with an improved depth wheel. More particularly, there is a demand for a row unit with depth wheels that are less likely to skid and cause a build up of trash.

SUMMARY OF THE INVENTION

The general object of this invention is to provide an improved row implement. A more particular object is to provide a row unit with at least one depth wheel that is less likely to skid and cause a build up of trash.

I have invented an improved row implement for tilling a row in soil. The implement comprises: (a) a frame comprising: (i) a toolbar bracket for attachment to a toolbar pulled by a tractor moving over a row; and (ii) a main body having a front portion attached to the toolbar bracket, the main body extending rearwardly from its front portion and forming a longitudinal axis overlying the row; (b) a disk and depth wheel assembly attached to the frame, the assembly comprising: (i) a bracket for attachment to the frame; (ii) a horizontal transverse freely rotating shaft within the bracket, the shaft forming a latitudinal axis; (iii) a disk attached to the shaft; and (iv) a depth wheel attached to the shaft on a side of the disk, so the shaft, disk, and the depth wheel rotate together; and (c) a knife shank assembly attached to the frame rearwardly of the disk and depth wheel assembly.

The row implement of this invention has at least one depth wheel that is less likely to skid and cause a build up of trash.

DETAILED DESCRIPTION OF THE INVENTION

1. The Invention in General

Figure 1:
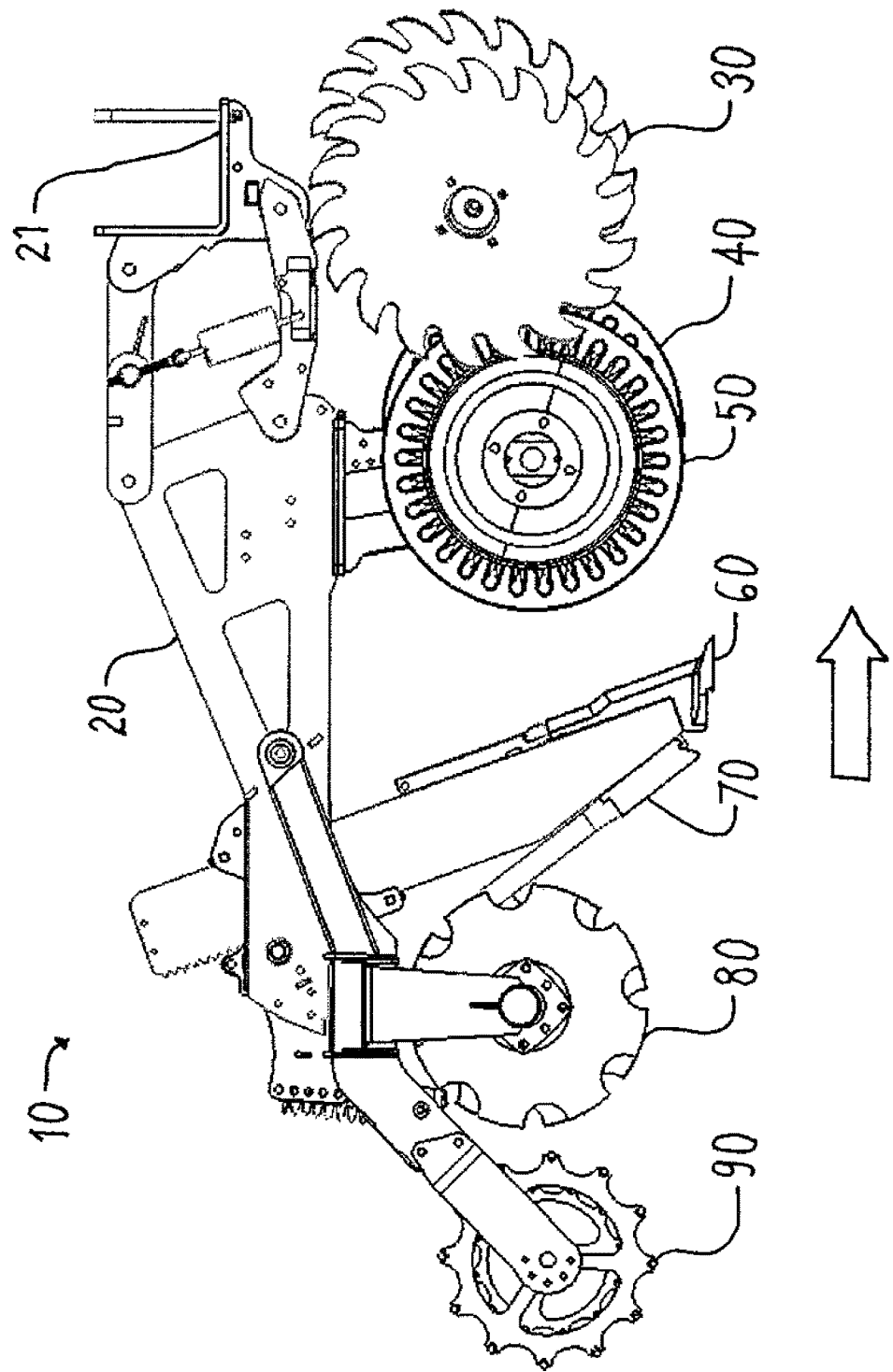
FIG. 1 is a side elevation view of a prior art row implement.
Figure 2:
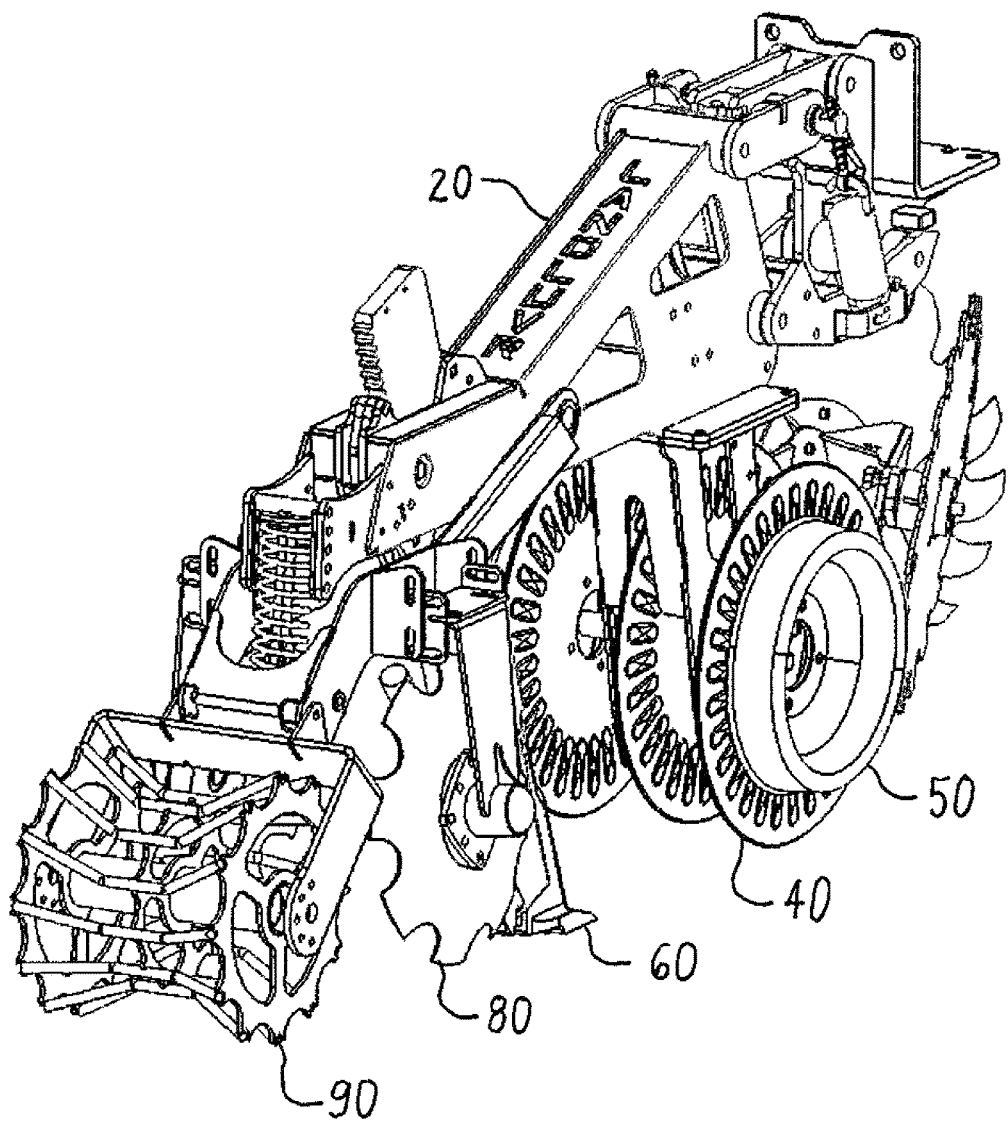
FIG. 2 is a rear and right side perspective view thereof.
Figure 3:
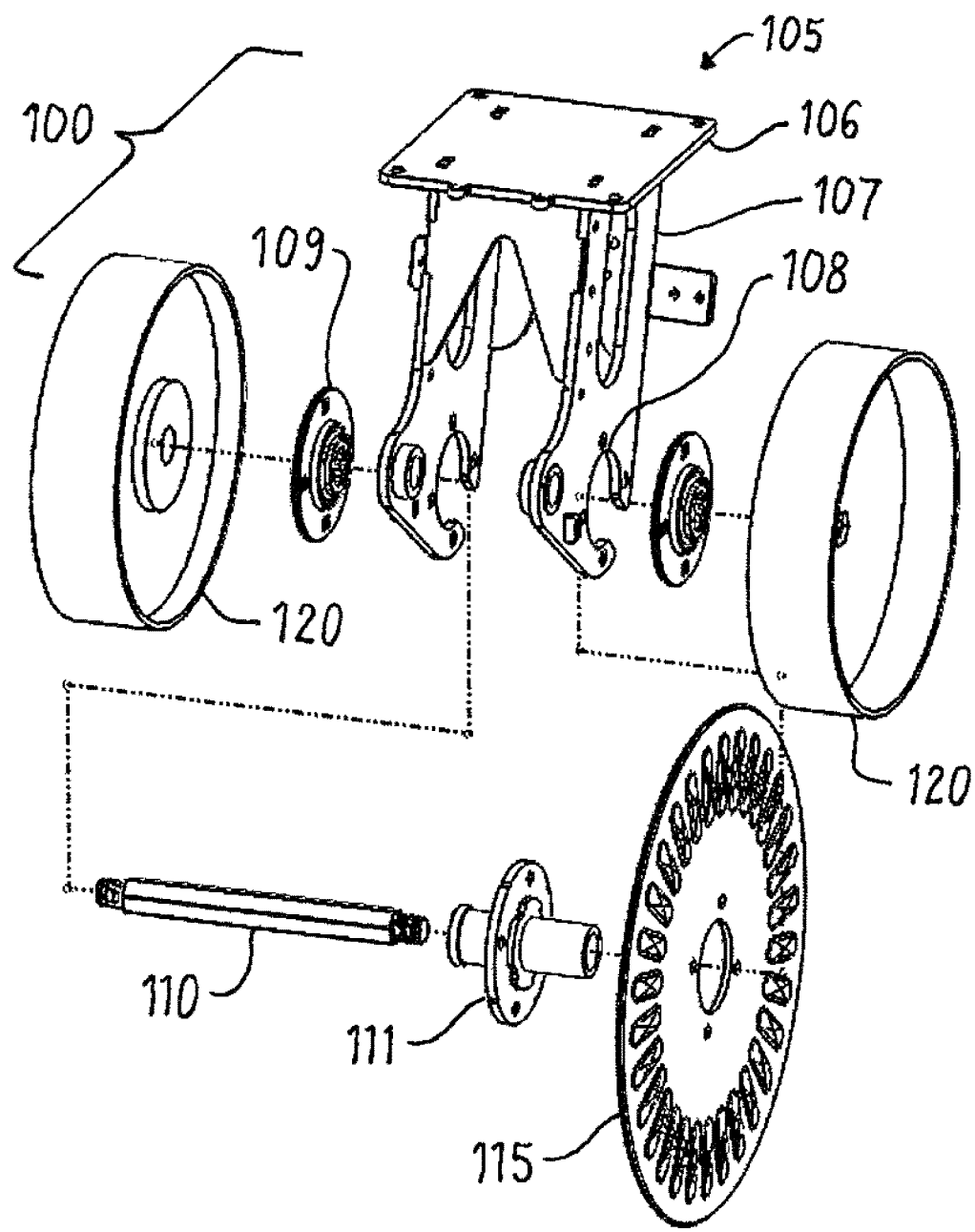
FIG. 3 is an exploded perspective view of the depth wheels of this invention.

This invention is best understood by reference to the drawings. Referring to FIG. 3, a preferred embodiment of the disk and depth wheel assembly 100 of this invention comprises a bracket 105, a shaft 110, a disk 115 attached to the shaft, and two depth wheels 120 mounted onto the shaft. The other components of a row implement are shown in FIGS. 1 and 2 and are omitted from FIG. 3 for clarity. The disk and depth wheel assembly is mounted on a row implement ahead of the knife. The disk and depth wheel assembly can be used in place of the disks and depth wheels assembly shown in FIGS. 1 and 2. The disk and depth wheel assembly of this invention can also be used in combination with other disks if desired.

2. The Bracket

The bracket 105 is attachable to the frame of the row implement. The preferred embodiment of the bracket has a horizontal top plate 106 and two spaced apart vertical plates 107. Each of the vertical plates has a semi-circular recess 108 for receiving a bearing 109.

3. The Shaft

The shaft 110 of the disk and depth wheel assembly is mounted horizontally and transversely to the frame and to the rows being formed in the ground. The shaft is positioned within the bracket and passes through the bearings in the vertical plates of the bracket. The shaft is freely rotatable so that it is turned as the disk and depth wheels make contact with the ground. The preferred embodiment of the shaft rotates with a sleeve 111 having a circular flange for attachment of the disk. The sleeve is attached in a fixed position to the shaft so that the shaft and the sleeve rotate together.

4. The Disk

The disk 115 is attached in a fixed position to the shaft so that it rotates with the shaft. In the preferred embodiment, the disk is attached to the flange which is, in turn, attached to the shaft. The disk is thus indirectly attached to the shaft. The disk rotates within the space between the vertical plates of the bracket. The disk is conventional. A variety of disk structures are known and the selection of the particular disk is a matter of choice. The number of disks on the shaft is generally one to three, but more are used if desired.

5. The Depth Wheels

The depth wheels 120 are attached in a fixed position to the ends of the shaft so that the shaft, sleeve, disk(s), and depth wheels rotate together as a single unit. The depth wheels have a diameter less than that of the disk. The depth wheels are preferably made of a non-pneumatic durable material. Steel is the most preferred material, but other metals, thermoplastics, hard rubbers, carbon fibers, and the like are also suitable. Pneumatic rubber depth wheels are less desirable because of their lack of durability. The number of depth wheels is generally one to three, but more are used if desired. The number of depth wheels is preferably two.

6. Use

The disk and depth wheel assembly is preferably mounted onto the frame of the row unit slightly ahead of the knife. The vertical position of the shaft, disk(s), and depth wheel(s) relative to the frame is fixed in the embodiment shown. If desired, adjustability is provided to the bracket by adding multiple attachment points. The vertical position determines the position of the other components of the row unit relative to the surface of the ground. One assembly is generally used per row unit, but two or more assemblies are used if desired.

As the row unit passes through the field, the shaft, disk, and depth wheel(s) rotate together. If the disk or a wheel encounters a rock, mud, or other obstacle that might hinder rotation, the rotational force provided by the other components in simultaneous contact with the ground is generally sufficient to overcome the obstacle and keep the shaft, disk(s), and depth wheel(s) rotating without causing a build up of trash. Furthermore, trash is less likely to build up on the disk(s) and depth wheel(s) because they are not attached and, therefore, form no corners at the point of attachment.

I claim:

1. A row implement for tilling a row in soil, the implement comprising:
    (a) a frame comprising: (i) a toolbar bracket for attachment to a toolbar pulled by a tractor moving over a row; and (ii) a main body having a front portion attached to the toolbar bracket, the main body extending rearwardly from its front portion and forming a longitudinal axis overlying the row;
    (b) a disk and depth wheel assembly attached to the frame, the assembly comprising: (i) a bracket for attachment to the frame; (ii) a horizontal transverse freely rotating shaft within the bracket, the shaft forming a latitudinal axis; (iii) a disk attached to the shaft; and (iv) a depth wheel attached to the shaft on a side of the disk without any contact between the depth wheel and the disk, so the shaft, disk, and the depth wheel rotate together as a unit; and
    (c) a knife shank assembly attached to the frame rearwardly of the disk and depth wheel assembly.

2. The row implement of claim 1 wherein the disk and depth wheel assembly of the row implement contains two depth wheels.

3. The row implement of claim 2 wherein the two depth wheels are attached on opposite sides of the disk.

4. The row implement of claim 3 wherein the depth wheels are non-pneumatic.

5. The row implement of claim 4 additionally comprising a sleeve on the shaft to which the disk is attached.

6. A row implement for tilling a row in soil, the implement comprising:
    (a) a frame comprising: (i) a toolbar bracket for attachment to a toolbar pulled by a tractor moving over a row; and (ii) a main body having a front portion attached to the toolbar bracket, the main body extending rearwardly from its front portion and forming a longitudinal axis overlying the row; and
    (b) a disk and depth wheel assembly attached to the frame, the assembly comprising: (i) a bracket for attachment to the frame; (ii) a horizontal transverse freely rotating shaft forming a latitudinal axis; (iii) a disk attached to the shaft; and (iv) a pair of spaced apart depth wheels attached to the shaft, one depth wheel on either side of the disk, without any contact between the pair of depth wheels and the disk, so the shaft, disk, and the depth wheels rotate together as a unit.

7. The row implement of claim 6 wherein the depth wheels are non-pneumatic.

8. A disk and depth wheel assembly for a row implement having a frame, the disk and depth wheel assembly comprising:
    (a) a bracket for attachment to a frame of a row implement forming a longitudinal axis;
    (b) a horizontal transverse freely rotating shaft within the bracket, the shaft forming a latitudinal axis;
    (c) a disk attached to the shaft; and
    (d) a pair of spaced apart depth wheels attached to the shaft, one depth wheel on either side of the disk, without any contact between the pair of depth wheels and the disk, so the shaft, disk, and the depth wheels rotate together as a unit.

9. The disk and depth wheel assembly of claim 8 wherein the depth wheels are non-pneumatic.

\* \* \* \* \*